(12) United States Patent
Gebhardt et al.

(10) Patent No.: US 10,816,103 B2
(45) Date of Patent: Oct. 27, 2020

(54) VALVE WITH SMA ELEMENT AND VALVE ARRANGEMENT INCLUDING SAME

(71) Applicant: Alfmeier Präzision SE, Treuchtlingen (DE)

(72) Inventors: Markus Gebhardt, Weißenburg (DE); Markus Köpfer, Regelweiler (DE)

(73) Assignee: ALFMEIER PRÄZISION SE, Treuchtlingen (DE)

( * ) Notice: Subject to any disclaimer, the term of this patent is extended or adjusted under 35 U.S.C. 154(b) by 0 days.

(21) Appl. No.: 16/059,420

(22) Filed: Aug. 9, 2018

(65) Prior Publication Data

US 2019/0049031 A1 Feb. 14, 2019

(30) Foreign Application Priority Data

Aug. 10, 2017 (DE) .................. 10 2017 118 260

(51) Int. Cl.
| F16K 31/00 | (2006.01) |
| F16K 31/02 | (2006.01) |
| F16K 27/02 | (2006.01) |
| F16K 11/044 | (2006.01) |
| F03G 7/06 | (2006.01) |

(52) U.S. Cl.
CPC .......... F16K 31/002 (2013.01); F16K 11/044 (2013.01); F16K 27/0263 (2013.01); F16K 31/025 (2013.01); F03G 7/065 (2013.01)

(58) Field of Classification Search
CPC .. F16K 31/002; F16K 11/044; F16K 27/0263; F16K 31/025; F03G 7/065
See application file for complete search history.

(56) References Cited

U.S. PATENT DOCUMENTS

| 5,325,880 | A  | * | 7/1994  | Johnson et al. | .......... F15C 3/04 |
|           |    |   |         |                | 137/1 |
| 6,691,977 | B2 | * | 2/2004  | Knebel et al.  | ....... G05D 23/025 |
|           |    |   |         |                | 239/553.3 |
| 7,748,405 | B2 | * | 7/2010  | Ghorbal et al. | ...... F16K 31/002 |
|           |    |   |         |                | 137/596.17 |
| 9,080,682 | B2 | * | 7/2015  | Deperraz et al. | ..... F16K 31/025 |
| 9,408,477 | B1 | * | 8/2016  | Robinson et al. | ... A47C 27/082 |
| 2013/0327967 | A1 | * | 12/2013 | Deperraz    | ................ F16K 11/22 |
|           |    |   |         |                | 251/11 |

(Continued)

FOREIGN PATENT DOCUMENTS

| DE | 102005060217 A1 | 7/2006 |
| DE | 102008021444 A1 | 11/2009 |

(Continued)

OTHER PUBLICATIONS

German Office Action dated Jun. 1, 2018 with English Translation.

*Primary Examiner* — Kevin L Lee
(74) *Attorney, Agent, or Firm* — JK Intellectual Property Law, PA (57) ABSTRACT

A valve includes a housing enclosing a pressure chamber. At least one media opening is closeable via a valve element activated by a wire-shaped SMA element connected at its ends to a printed circuit board and at its middle to the valve element. The wire-shaped SMA element extends in a plane parallel to a direction of movement of the valve element.

14 Claims, 4 Drawing Sheets

(56) References Cited

U.S. PATENT DOCUMENTS

| | | | |
|---|---|---|---|
| 2014/0103232 A1* | 4/2014 | Deperraz | F16K 11/10 251/11 |
| 2014/0125042 A1* | 5/2014 | Kopfer et al. | F16K 11/044 280/742 |
| 2019/0049033 A1* | 2/2019 | Mitzler et al. | F16K 31/025 |
| 2019/0056040 A1* | 2/2019 | Mitzler et al. | F16K 31/02 |
| 2020/0101883 A1* | 4/2020 | Beuschel et al. | F16K 31/025 |

FOREIGN PATENT DOCUMENTS

| | | |
|---|---|---|
| DE | 102012214597 A1 | 2/2013 |
| DE | 102012222570 A1 | 6/2014 |

* cited by examiner

VALVE WITH SMA ELEMENT AND VALVE ARRANGEMENT INCLUDING SAME

CROSS-REFERENCE TO RELATED APPLICATION

This application claims benefit to German Patent Application Number 10 2017 118 260.8, filed Aug. 10, 2017, which is incorporated in its entirety by reference herein.

TECHNICAL FIELD

The disclosure refers to a valve with a housing that encloses a pressure chamber and at least a first media opening, wherein at least one valve element is arranged inside the pressure chamber to control the first media opening (i.e. that opens and closes the first media opening). Here, the valve element is activated by a wire-shaped SMA (shape memory alloy) element. The disclosure also refers to a valve arrangement with several valves.

BACKGROUND

A valve with a housing enclosing a pressure chamber formed by a housing shell open on one side and a printed circuit board closing it is known from DE 10 2012 212 686 A1. Inside the pressure chamber, a valve element has been arranged for opening and closing at least one media opening, wherein the valve element is activated by a wire-shaped SMA element electrically connected to the printed circuit board. Here, the wire ends of the SMA element are fixed in such a way to the printed circuit board that they run obliquely to one another and enclose an angle of about 90° between them. In this case, a middle section of the SMA element engages around a circumferential surface of the valve element. Although such an orientation of the SMA element allows the valve element to be guided as much as possible in a straight line, as an acting restoring force of a return element pre-stressing the valve element cannot be fully compensated in the direction of movement of the valve element. On the other hand, this causes higher friction forces on the wire-shaped SMA element that can shorten its service life. Moreover, in various uses or application fields, a preferably space-saving arrangement of the valves or of several valves beside one another is desirable inside a valve arrangement.

SUMMARY

It is therefore the task of the disclosure to suggest an improved valve and valve arrangement with regard to the aforementioned disadvantages.

The task mentioned first is solved by a valve having the characteristics according to the present disclosure. The valve comprises a housing that encloses a pressure chamber with at least one first media opening. In the pressure chamber, at least one valve element, especially a first valve element, has been arranged, which is activated by at least one wire-shaped SMA element, especially a first wire-shaped SMA element, which is movable along a direction of movement, especially along a first direction of movement between a first position, in which the at least one or first valve element closes the first media opening, and a second position, in which the at least one or first valve releases the first media opening. Here, the at least one or first wire-shaped SMA element is connected to a printed circuit board with a first end and with a second end, and in a middle section to the at least one or first valve element in such a way that the at least one or first wire-shaped SMA element extends in a plane oriented parallel to the first direction of movement, especially in a first plane.

In other words, the valve element is moved parallel to, especially along, a plane spanning from the first end, the second end and the middle section of the wire-shaped SMA element between the first position, namely the closing position, and the second position, specifically the opening position—with regard to the first media opening. Thus, the direction of movement of the valve element runs in, or parallel to, the plane in which the SMA element extends. In this case, the direction of movement and the plane run especially in such a way that they cut the printed circuit board under a perpendicular angle. Here, the sides of the SMA element that extend away from the valve element enclose among themselves an angle opening up towards the printed circuit board that can, in principle, take any value between 0° and 180°, wherein an angle between 130° and 160° is advantageous with regard to the activation of the SMA element. Such an arrangement of the SMA element has the advantage of greatly reducing the friction between the wire-shaped SMA element and the valve element. Furthermore, this also allows the manufacturing of more compact valves. The arrangement additionally makes it possible to achieve a degree of freedom in the valve element angle in relation to the valve seat, which allows the valve element to cling to the valve seat.

The wire-shaped SMA element is a wire made of a shape memory alloy (SMA) that comes in two different microstructures depending on the temperature. At room temperature, there is a martensitic structure that transforms into an austenitic structure at a certain limit temperature (about 80° C.). During the transformation to an austenitic state, the wire shortens and can therefore activate the valve element. To heat up the wire-shaped SMA element, electric current is supplied to it. So it can do this, the wire-shaped SMA element is electrically and mechanically connected to the printed circuit board. Here, electric contacting of the two ends of the SMA element supply the SMA element with voltage through conductor paths of the printed circuit board. The two ends of the SMA element are mechanically fixed to the printed circuit board with crimp elements, for example. The printed circuit board itself consists, for example, of a composite (especially of FR4 material), while the valve housing is made of plastic for practical purposes. Alloys having a shape memory effect are above all iron-based alloys, copper-based alloys and nickel-titanium-based alloys.

The housing includes, for example, a first housing part and a second housing part that enclose the printed circuit board between themselves. Alternatively, the housing includes a first housing part and a second housing part, wherein the second housing part is formed by the printed circuit board. Thus, the printed circuit board is arranged inside the housing or forms a part of the housing itself. The first housing part is executed as housing shell and connected to the second housing part or printed circuit board in such a way that the pressure chamber enclosed by the housing is closed in a pressure-tight way. In addition, a sealing plate made of an elastomeric material can be arranged between the printed circuit board and the first housing part. A printed circuit board arranged inside the housing has the advantage of protecting it against damage. Using the printed circuit board simultaneously as part of the housing, on the contrary, allows a more compact valve design and an easier connection of the SMA element, since electrical connection elements like a housing plug can be dispensed with.

In a preferred design of the valve, the housing has a second media opening controlled by the first valve element, wherein the first valve element opens the second media opening in the first position and closes it in the second position.

In another preferred embodiment, the housing has a second media opening controlled by an additional or second valve element arranged in the pressure chamber, which is activated by an additional or second wire-shaped SMA element and can be moved along another or second direction of movement between a first position, in which the second valve element closes the second media opening, and a second position, in which the second valve element releases the second media opening. The second wire-shaped SMA element is analogously connected in such a way to the first wire-shaped SMA element, likewise electrically to the printed circuit board with a first end and with a second end, and in a middle section to the second valve element that the second SMA element extends parallel to a second plane oriented to the second direction of movement.

The second valve element can be controlled, in particular, fully independently from the first valve element, so that the first and second media opening can be opened and closed independently from one another. Thus, for each media opening, one own valve element is preferably used, so that several switching positions, namely closed first and second media opening, closed first media opening and opened second media opening, opened first media opening and closed second media opening as well as opened first and second media opening, can be carried out. Here, the second direction of movement runs preferably parallel to the first direction of movement, the first plane is preferably oriented parallel to the second plane, thus allowing a compact design to be achieved.

Preferably, the first wire-shaped SMA element moves the first valve element with regard to the first media opening, which is located especially in a first housing part of the housing, in opening direction, and/or the second wire-shaped SMA element preferably moves the second valve element with regard to the second media opening, which is located especially in the printed circuit board and/or a second housing part of the housing, in closing direction. In other words, the first SMA element activates the first valve element in opening direction with regard to the first media opening, thus towards the second position, so that the first media opening is closed in the non-energized state of the first SMA element and open in the energized state. The second SMA element activates the second valve element in closing direction with regard to the second media opening, thus towards the first position, so that the second media opening is open in the non-energized state of the first SMA element and closed in the energized state. Since each SMA element is fixed or connected to the printed circuit board with its respective ends, the first and second media opening are therefore arranged in opposite parts of the housing.

The first valve element and/or the second valve element is especially mounted in such a way that it executes a translational (i.e. linear) movement between the first position and the second position, wherein the first direction of movement of the first valve element and/or the second direction of movement of the second valve element run perpendicularly to the printed circuit board. Here, the first or second SMA element of the first or second valve element is advantageously arranged symmetrically around the respective valve element and therefore the two sides of the corresponding SMA element are equally long in order to secure a rectilinear movement of the first or second valve element when the SMA element is shortened.

To additionally ensure a repeatable and rectilinear movement of the first and/or second valve element, the first valve element and/or the second valve element are guided into a recess of the housing, especially into a recess of the first and/or second housing part and/or of the printed circuit board and/or of a sealing plate, arranged between the printed circuit board and the second housing part. The corresponding recess in which the first and/or second valve element is mounted in sections, is especially arranged here opposite the first or second media opening in the first or second direction of movement, so that the first and/or the second valve element are guided in each case from the first to the second position and vice versa into the housing during the entire movement.

In an advantageous design, the valve especially includes at least a first spring element moving the first valve element in closing direction with regard to the first media opening, and/or at least especially a second spring element moving the second valve in opening direction with regard to the second media opening. Thus, the first spring element counteracts the force of the first SMA element in the energized state, and the second spring element counteracts the force of the second SMA element in the energized state. Hence, the spring elements act as return elements for the respective valve element, so that the first valve element can be moved back to its first position (i.e. closing position) and the second valve element to its second position (i.e. opening position), as soon as the respective SMA element ceases to be energized. Here, one or several spring elements can be allocated to each valve element depending on the counteracting pressure.

The at least one, especially first spring element, includes preferably one leaf spring and/or one threaded compression spring resting on the printed circuit board and/or on the housing and pre-stressing the first valve element in its first position (i.e. in closing direction) and/or the at least one, especially second, spring element includes preferably one leaf spring and/or one threaded compression spring resting on the printed circuit board and/or on the housing and pre-stressing the second valve element in its second position (i.e. in opening direction).

To ensure a pressure-tight pressure chamber inside the housing and a secure closing of the media openings in the corresponding positions of the valve elements, in a preferred embodiment at least one, especially a first, sealing element has been arranged on a side of the first element facing the first media opening that acts together with the first media opening, especially with a sealing seat delimiting the first media opening and/or at least one, especially a second, sealing element has been arranged on a side of the first or second valve element facing the second media opening that acts together with the second media opening, especially with a sealing seat delimiting the second media opening.

Here, the sealing seat delimiting the first media opening and/or the second media opening is especially a sealing element that fully engages around or intermeshes with the first media opening and/or second media opening. Such a sealing element is, for example, a conical seal, which fully penetrates the first and/or second media opening and engages both on the housing side facing the pressure chamber and on the external side of the housing, thus engages both sides. Such elastic conical seals have the advantage of being very easily pre-assembled on the printed circuit board or valve housing or inserted through the printed circuit board recesses formed by the media openings or the valve housing and sealed up with a flat surface.

To allow the wire-shaped SMA elements to slip and their preferably frictionless movement, the first valve element and/or the second valve element preferably have guiding elements to guide the first wire-shaped SMA element and/or the second wire-shaped SMA element, wherein the guiding elements include especially a recess extending along the first and/or second plane, for example a groove, in which the first and/or second wire-shaped SMA element is inserted. Therefore, the first and/or second wire-shaped SMA element is held in such a form- and/or force-fitting way to the first or second valve element that the respective valve element that the respective valve element is activated when the corresponding SMA element is energized and thus shortens it. Here, a recess for guiding the first valve element extends, for example, from a circumferential surface of the valve element starting along or towards the first or second plane and perpendicular to the first or second direction of movement into the valve element or it extends on a side of the first valve element facing the first media opening or on a side of the second valve element facing away from the second media opening, thus from the respective upper side, along or towards the first or second plane and perpendicular to the first or second direction of movement.

In another preferred design, the valve or housing has a third media opening. In a valve with three media openings, the first media opening is preferably a pressure connection, the second media opening an atmosphere connection and the third media opening a connection for a media reservoir, especially for an air cushion, which is part of an air cushion system integrated into a vehicle seat.

The second-mentioned task is solved by a valve arrangement having the characteristics according to claim 14. The valve arrangement includes several valves of the type described above, wherein the housing that in each case encloses the pressure chamber of a valve or first housing parts and/or second housing parts and/or printed circuit boards and/or sealing plates are executed especially as one piece. In other words, the valve arrangement has advantageously a common housing or common housing parts and/or a common printed circuit board and/or a common sealing plate for all valves, so that, for example, the first housing part is closed by a common second housing part and/or a common printed circuit board. For example, an air cushion system of a vehicle seat having several air cushions can be controlled with such valve arrangement.

BRIEF DESCRIPTION OF THE DRAWINGS

The disclosure will be explained in more detail below, also with regard to additional characteristics and advantages through the description of embodiments and the reference to the enclosed drawings, which in each case show in a schematic sketch.

Figure 1:
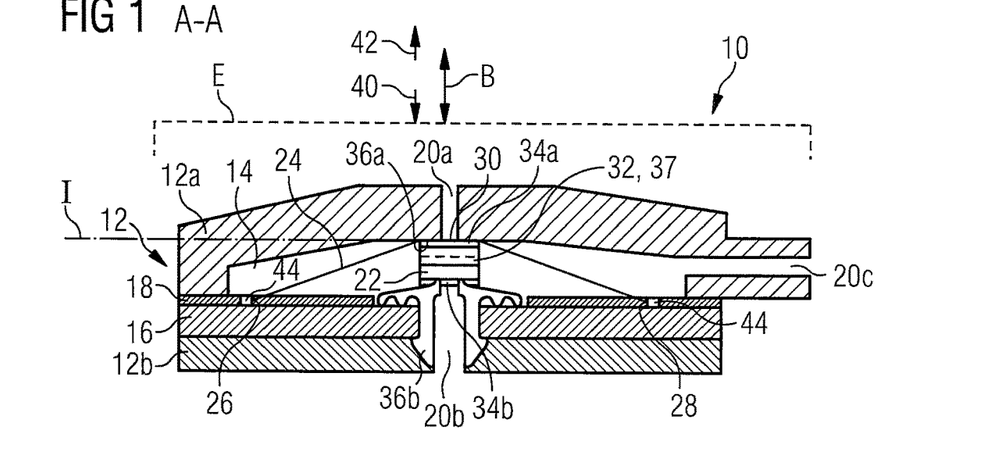
FIG. 1 is a cross-sectional view of a valve with a valve element that is in the first position.
Figure 2:
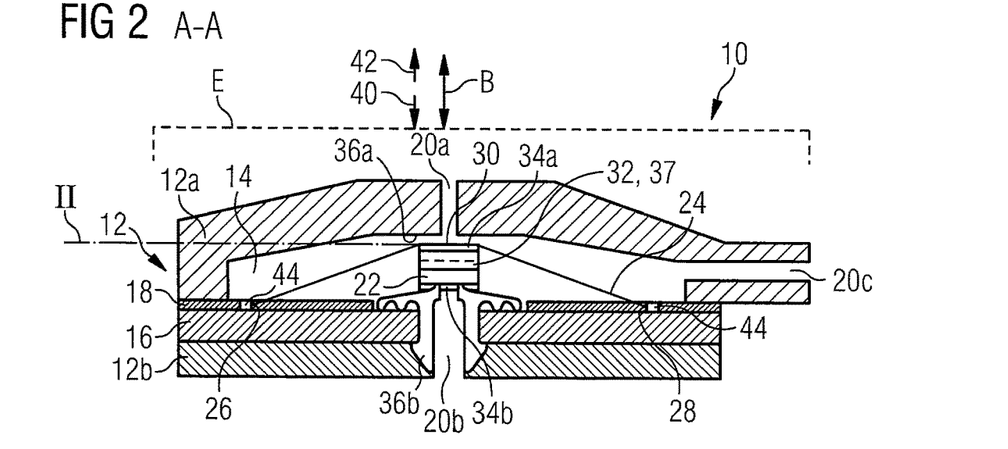
FIG. 2 is a cross-sectional view of a valve according to FIG. 1, wherein the valve element is in the second position.
Figure 3:
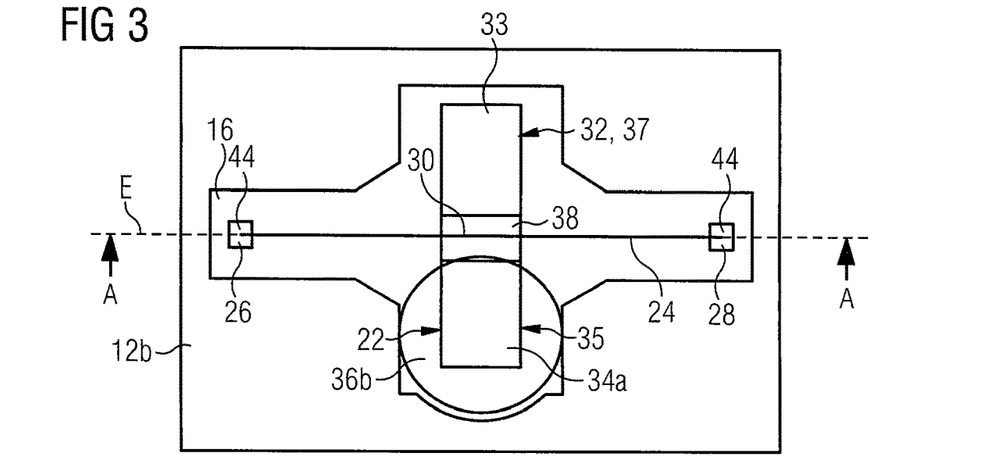
FIG. 3 is a top view of a valve according to FIG. 1.

FIGS. 1 to 3 show a valve 10 according to a first embodiment. The valve 10 includes a housing 12 formed by a first housing part 12a, specifically a housing shell, and formed by a second housing part 12b closing it, namely a housing bottom, and a pressure chamber 14. Between the housing shell 12a and the housing bottom 12b there are one printed circuit board 16 and one sealing plate 18, made for example of an elastomer, arranged and pressed into in such a way that the pressure chamber 14 is enclosed in a pressure-tight way. The housing 12 or the housing shell 12a has a first media opening 20a. Basically, various fluids or gases are considered as medium, but a pneumatic valve is exemplarily described below, so that the air medium and the first media opening 20a are in this case a pressure connection for connection to a pressurized air source.

According to FIG. 1, the first media opening 20a is closed by a first valve element 22 (in this embodiment the only one), which is in a first position I in FIG. 1. The valve element 22 is activated by a first wire-shaped SMA element 24 (in this embodiment the only one) and movable along a direction of movement B between the first position I and a second position II (see FIG. 2), in which the first valve element 22 releases the first media opening 20a. The SMA element 24 is connected to the printed circuit board 16 with a first end 26 and a second end 28, and arranged on the valve element 22 with a middle section 30. Here, the wire-shaped SMA element 24 extends in a plane E, which extends parallel to the direction of movement B and lies in the paper plane according to FIGS. 1 and 2 (section A-A from FIG. 3).

FIG. 3 shows a top view of the valve 10 in opening direction 40, wherein the first housing part 12a has been removed for better depiction. The SMA element 24 extends in plane E. In other words, the first end 26 and the second end 28 of the SMA element 24 are in each case fixed to the printed circuit board 16, lie on a straight line and thus enclose a 180° angle between themselves. The fastening of the wire ends 26, 28 of the SMA element 24 is, for example, accomplished with crimp elements 44, which are electrically connected to the printed circuit board 16. To activate the SMA element 24, it is energized, i.e. a first end 26 is connected to a positive terminal and a second end 28 is connected to a negative terminal of a voltage source. As a result of the energization, the SMA element 24 shortens and is moved starting from its first position I (FIG. 1) in the direction of movement B and in opening direction 40 in its second position II (FIG. 2).

The wire-shaped SMA element 24 moves the valve element 22 in opening direction 40 with regard to the first media opening 20a, which means that when the SMA element 24 is active or energized, the valve element 22 releases the first media opening 20a and a medium can flow into the pressure chamber 14, as FIG. 2 shows. To ensure a quick and reliable closing of the first media opening 20a when the SMA element 24 is inactive (i.e. non-energized), the valve element 22 is moved in closing direction 42 with regard to the media opening 20a by a spring element 32 executed as a leaf spring 37 and extending in FIGS. 1 and 2 into the paper plane starting from the valve element 22. The spring element 32 or leaf spring 37 has been executed overall more or less in a tongue shape and rests on the printed circuit board 16 with a first end section 33 or is directly or indirectly attached to the printed circuit board 16, for example with mechanical fixation elements such as rivets, for example (FIG. 3). A second end section 35 located away from the first end section 33 moves the valve element 22 towards the first media opening 20a, wherein the spring element 32, 37 or the second end section 35 extends into the valve element 22, it is therefore roughly extrusion-coated by the plastic material of the valve element 22. Thus, the spring element 32, 37 causes a restoring force, which presses the first valve element 22 towards the first media opening 20a and in its first position I, so that it closes the first media opening 20a when the SMA element 24 is inactive. The spring element 32 therefore pre-stresses the valve element 22 into its first position I. The movement of the first valve element 22 along the direction of movement B between the first position I and the second position II occurs linearly and perpendicularly to the printed circuit board 16 owing to the orientation of the SMA element 24. Moreover, the rectilinear orientation of the SMA element 24 or its ends 26, 28 reduces the friction between the SMA element 24 and the valve element 22, thereby significantly increasing the service life and number of cycles of the valve 10.

The housing 12 also has a second media opening 20b executed in the housing bottom 12b, in this case to connect the pressure chamber 14 to the atmosphere. The printed circuit board 16 and the sealing plate 18 have recesses supplementing the second media opening 20b in order to allow a fluidic connection of the pressure chamber 14 to the surroundings. The second media opening 20b is here also controlled by the valve element 22, which opens the second media opening in the first position I (FIG. 1) and closes it in the second position II (FIG. 2).

The housing 12 also has a third media opening 20c, in this case for a media reservoir located in the housing shell 12a. The first valve 10 is therefore exemplarily executed as ½-way valve, i.e. has three openings or connection possibilities and two switching positions, namely to vent or fill the media reservoir when the first media opening 20a is released and the media opening 20b is closed, and venting it when the first media opening 20a is closed and the second media opening 20b is open.

The valve element 22 has a first sealing element 34a on a side facing the first media opening 20a that acts together with the first media opening 20a to close the pressure chamber in a reliable pressure-tight way with the valve element 22 in the first position I. Here, the sealing element 34a acts together with a sealing seat 36a, formed here by the opening edge of the first media opening 20a itself. On a side facing the second media opening 20b, the valve element 22 has a sealing element as well, a second sealing element 34b, which acts together with a sealing seat 36b executed here as a sealing element 36b that fully engages around and intermeshes with the second media opening 20b. The sealing element 36b is, for example, glued to the second media opening 20b or fastened therein with mechanical fastening elements.

To guide the wire-shaped SMA element 24, the valve element 22 has guiding elements in form of a recess 38 or groove extending towards the wire-shaped SMA element 24 and perpendicularly to the direction of movement B, in which the wire-shaped SMA element 24 is inserted. The recess 38 additionally extends starting from the side facing the first media opening 20a in the direction of movement B and into the valve element 22, it is thus formed on an upper side of the valve element 22. The valve element 22 is guided here in the direction of movement B mostly via the spring element 32.

FIGS. 4 to 7 show a valve 110 with two valve elements, namely a first valve element 122a and a second valve element 122b. The valve 110 additionally includes a housing 112, which is formed, in turn, by a first housing part 112a (specifically a housing shell) and a second housing part 112b closed by it, namely a housing bottom, and encloses a pressure chamber 114 in which the first valve element 122a and the second valve element 122b are arranged. Between the first housing part 112a and the second housing part 112b there are, in turn, a printed circuit board 116 and a sealing plate 118 arranged in such a way that the pressure chamber 114 is closed in a pressure-tight way. Such a fluid-tight connection can take place, for example, by mutually pressing the first housing part 112a, the printed circuit board 116 and the second housing part 112b together while clamping the sealing plate 118 and using fastening elements in form of rivets, screws or the like.

Figure 4:
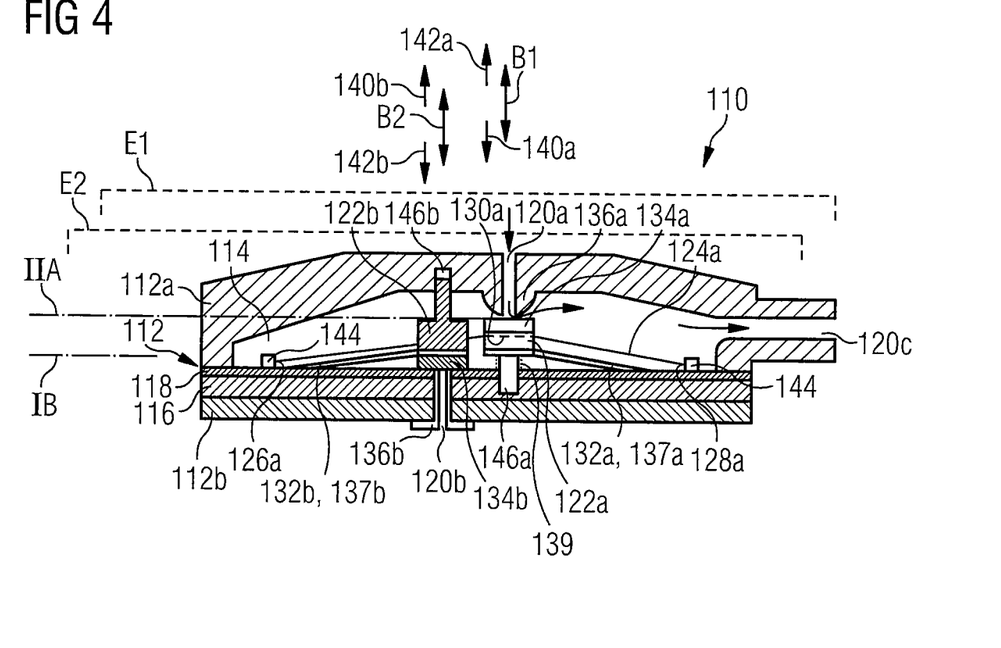
FIG. 4 is a cross-sectional view of a valve with a first valve element and a second valve element in a first switching position.
Figure 5:
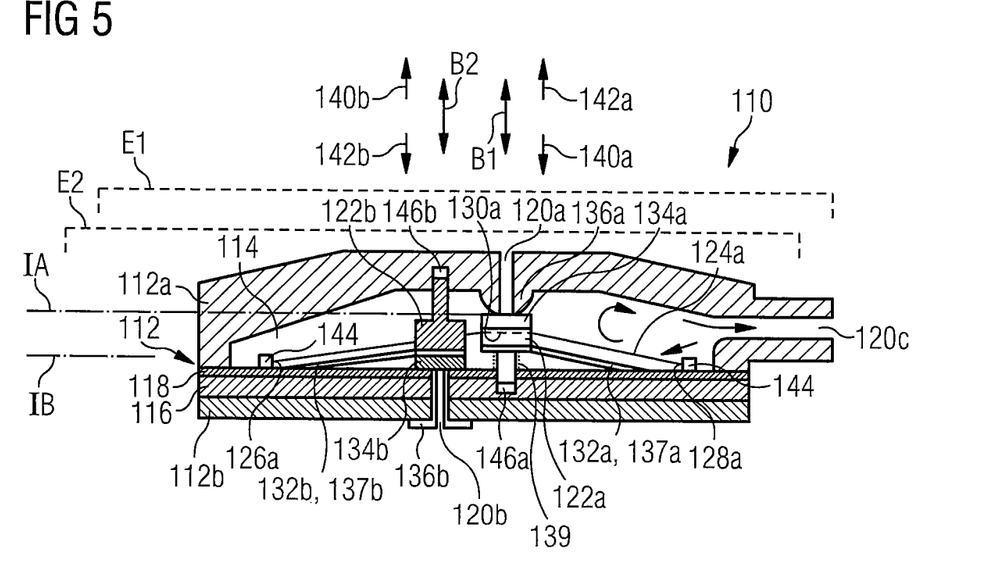
FIG. 5 is a cross-sectional view of a valve with a first valve element and a second valve element in a second switching position.
Figure 6:
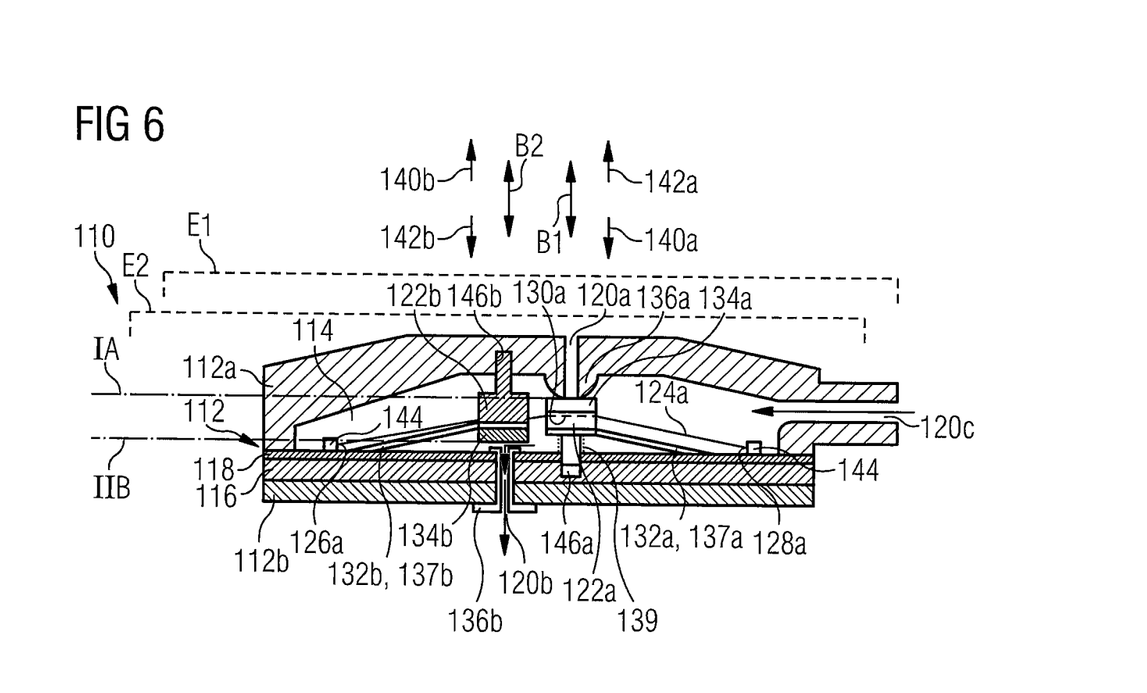
FIG. 6 is a cross-sectional view of a valve with a first valve element and a second valve element in a third switching position.

The valve 110 has three media openings 120a, 120b, 120c, wherein a first media opening 120a—here a pressure connection or air inlet—and a third media opening 120c— here a connection for a media reservoir (e.g. an air cushion of a vehicle seat system)—are formed in the first housing part 112a and a second media opening 120b penetrates the printed circuit board 116, the sealing plate 118 and the second housing part 112b and ends in the atmosphere.

The first valve element 122a, activated by a first wire-shaped SMA element 124a, is movable along a first direction of movement B1 between a first position IA and a second position IIA. In the first position IA (FIGS. 5 and 6), the first valve element 122a closes the first media opening 120a; in the second position IIA (FIG. 4), the first valve element 122a releases the first media opening 120a, so that a fluid, especially air, can flow into the pressure chamber. The first SMA element 124a is mechanically attached to the printed circuit board 116 with a first end 126a and with a second end 128a and electrically connected to it. A middle section 130 of the first SMA element 124a is arranged on the first valve element 122a or connected to it, so that the first SMA element 124a extends in a first plane E1 oriented parallel to the first direction of movement B1 and, according to FIGS. 4, 5 & 6, running parallel to the paper plane.

The second valve element 122b, movable along a second direction of movement B2 between a first position IB and a second position IIB, is activated by a second wire-shaped SMA element 124b. In FIGS. 4 to 6, the second valve element 122b is shown in a sectional view, making the second wire-shaped SMA element 124b invisible. In the first position IB (FIGS. 4 and 5), the second valve element 122b closes the second media opening 120b; in the second position IIB (FIG. 6), the second valve element 122b releases the second media opening 120b, so that a fluid (especially air), can flow out of the media reservoir and the pressure chamber. The second SMA element 124b is mechanically fixed to the printed circuit board 116 with a first end 126b and with a second end 128b and electrically connected to it. A middle section 130b of the second SMA element 124b is arranged on the second valve element 122b or connected to it, so that the second SMA element 124b extends in a second plane E2 oriented parallel to the second direction of movement B2 and running in the paper plane. In addition, the first direction of movement B1 and the second direction of movement B2 as well as the first plane E1 and the second plane E2 are oriented here parallel to one another.

Thus, an own SMA element 124a, 124b is allocated to each valve element 122a, 122b, thereby ensuring an energization of the SMA wires 124a, 124b independently from one another and thus ensuring a fully independent separate activation of the first valve element 122a and second valve element 122b. Each valve element 122a, 122b controls one of the two media openings 120a, 120b, so that they can be released and closed independently from one another. Both valve elements 122a, 122b execute a linear or rectilinear movement between the first position IA, IB and the second position IIA, IIB, wherein the directions of movement B1, B2 run in each case perpendicularly to the printed circuit board 116.

The first wire-shaped SMA element 124a moves the first valve element 122a in opening direction 140a with regard to the first media opening 120a, the second wire-shaped SMA element 124b moves the second valve element 122b in closing direction 142b with regard to the second media opening 120b. According to FIG. 4, both the first SMA element 124a and the second SMA element 124b are energized, so that both SMA elements 124a, 124b shorten and both valve elements 122a, 122b are activated or moved. Thus, the first valve element 122a, which is in its second position IIA, releases the first media opening 120a, whereas the second valve element 122b, which is in its first position IB, closes the second media opening 120b. As a result of this, a medium (or air) can flow into the pressure chamber 114 and be supplied to the media reservoir through the third media opening 120c. The media reservoir, especially an air cushion, is therefore filled during a switching state of the valve 110 according to FIG. 4.

In the switching state shown in FIG. 5, the first SMA element 124a is not energized, so the first valve element 122a is now in a position IA that closes the first media opening 120a. The second valve element 122b is in the same position, namely in position IB as in the switching state shown in FIG. 4, and closes the second media opening 120b. This closes the pressure chamber 114 completely and the fluid or air volume that is inside the pressure chamber 114 or inside the media reservoir remains constant. As a result of that, the pressure is maintained constant in the media reservoir, i.e. in the air cushion, for example.

So the first valve element 122a can be reliably moved in closing direction 142a from the second position IIA (FIG. 4) to the first position IA (FIGS. 5 and 6) when the electric current is turned off, the first valve element 122a is moved by a first spring element 132a in closing direction 142a with regard to the first media opening 120a. Here, the first spring element 132a includes a leaf spring 137a, which in turn rests on the printed circuit board 116 with a first end section 133a or is directly or indirectly fixed to it. A second end section 133b spaced apart from the first end section 133a moves the valve element 122a towards the first media opening 120a. In this case, the spring element 132a or the leaf spring 137a fits closely on an underside of the valve element 122a or is integrated into the underside of the valve element 122a and presses the valve element 122a upwards in the direction of movement B1. Furthermore, the first spring element 132a additionally includes a threaded compression spring 139, whose first end is arranged in a ring-shaped recess in the printed circuit board 116 and whose second end rests on the underside of the valve element 122a or on the leaf spring 137a. Here, the threaded compression spring 139 aids the leaf spring 137a in pre-stressing the first valve element 122a opposite the first media opening 120a, which is especially advantageous when there is a permanent pressure being exerted from outside the housing 112 on the first media opening. Thus, the first spring element 132a or the leaf spring 137a and the threaded compression spring 139 bring about a restoring force or pre-stress the first valve element 122a to its first position IA, wherein the first valve element 122a is pressed towards the first media opening 120a (i.e. towards the first position IA), so that it closes the first media opening 120a when the SMA element 124a is inactive.

In the switching state shown in FIG. 6, neither one of the two SMA elements 124a, 124b is energized; thus, the first valve element 122a is in its first position IA and closes the first media opening 120a, the second valve element 122b is now in its second position IIB and releases the second media opening 120b. As a result of this, the medium (or the air) can flow from the media reservoir through the third media opening 120c into the pressure chamber 114 and guided to the atmosphere via the second media opening 120b or escape out of the pressure chamber 114. The media reservoir, especially an air cushion, is vented in this way in a switching state of the valve 110 according to FIG. 6.

So the second valve element 122b can also be reliably and quickly moved in opening direction 140b from the first position IB to the second position IIB when the electric current is turned off, the second valve element 122b is likewise moved by a spring element, namely a second spring element 132b, in opening direction 140b with regard to the second media opening 120b. Here, the second spring element 132b is executed as leaf spring 137c, which in turn, rests on the printed circuit board 116 with a first end section 133b or is directly or indirectly fixed thereto and its second end section 135b moves the valve element 122b in opening direction 140b—with regard to the second media opening 120b. The leaf spring 137c extends here partially, specifically is inserted into the valve element 122b with the second end section 135b and brings about a restoring force or pre-stresses the second valve element 122b in its second position IIB, wherein the second valve element 122b opens the second media opening 120b when the SMA element 124b is inactive.

The valve 110 is thus executed as a 3/3-way valve and therefore has three openings or connection possibilities and three switching positions, namely filling and venting of the air cushion, for example, and maintaining the pressure in the air cushion.

To ensure a rectilinear movement of the first and second valve element 122a, 122b, they are least partially guided in a recess 146a, 146b of the housing 112 or sealing plate 118 and/or printed circuit board 116; here, the first valve element 122a is executed in a recess 146a of the first housing part 112a and the second valve element 122b in a recess 146b, executed both in the printed circuit board 116 and in the sealing plate 118. To make this possible in a constructively easy way without having to make costly modifications to the housing 112 or printed circuit board 118 and sealing plate 116, the valve elements 122a, 122b have in each case at least an end section with a smaller diameter facing the recess 146a, 146b or partially mounted therein. In this case, the recess 146a lies opposite the first media opening 120a, the recess 146b the second media opening 120b, so the valve elements 122a, 122b can only move in a straight line in the direction of movement B1, B2.

Figure 7:
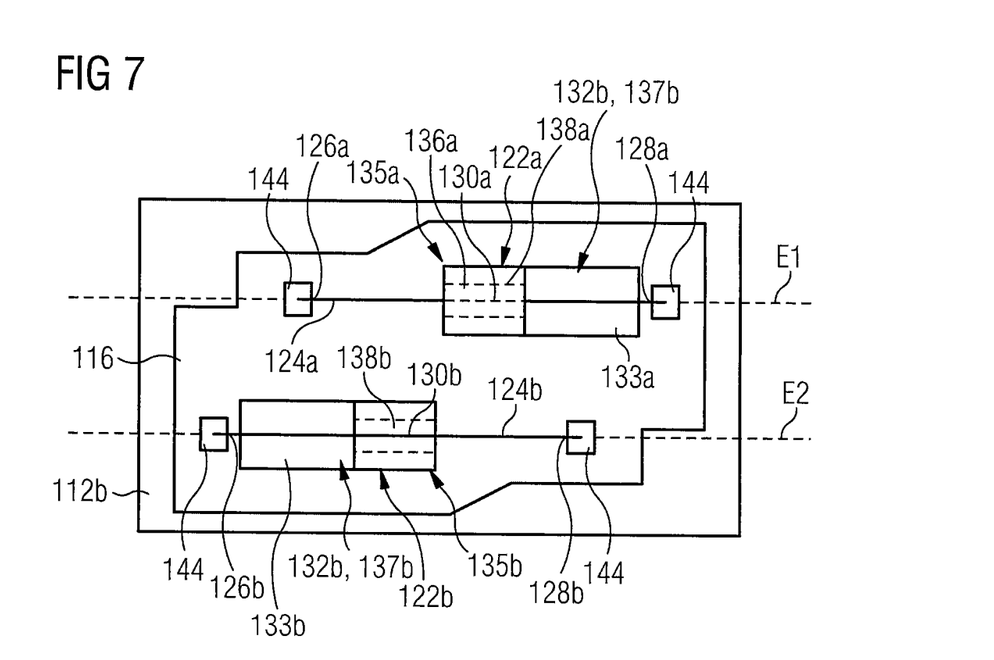
FIG. 7 is a top view of a valve according to FIGS. 4 to 6.

FIG. 7 shows a top view of the valve 110 in opening direction 140a or in closing direction 142b, wherein once again the first housing part 112a or the upper housing shell is hidden. The first SMA element 124a extends in plane E1, the second SMA element 124b extends in plane E2. In other words, the corresponding ends 126a, 128a or 126a, 128b are in each case fixed to the printed circuit board 116, lie in each case in a straight line and thus enclose a 180° angle between themselves. The first and second SMA element 124a, 124b of the two planes E1, E2 are oriented parallel to one another here. The wire ends 126a, 128a, 126b, 128b of the SMA elements 124a, 124b are in this case also accomplished by means of crimp elements 144a, 144b, for example, which are electrically connected to the printed circuit board 116. To activate the corresponding SMA element 124a, 124b, it is energized, i.e. the corresponding first end 126a, 126b is connected to the positive terminal and the corresponding second end 128a, 128b is connected to the negative terminal of a voltage source, so that the respective SMA element 124a, 124b is shortened. As a result of the energization, the first SMA element 124a is moved from its first position IA (FIGS. 5 and 6) in the direction of movement B1 or in opening direction 140a to its second position IIA (FIG. 4), and as a result of the energization, the second SMA element 124b is moved from its second position IIB (FIG. 6) in the direction of movement B2 or closing direction 142b to its first position IB (FIGS. 4 and 5).

To seal the media openings in a fluid-tight way, the first valve element 122a has a sealing element 134a on one side facing the first media opening 120a, thus on its upper side, which acts together with a sealing seat 136a that delimits the first media opening 120a, formed here by the first housing part 112a itself. The second valve element 122b has a sealing element 134b on a side facing the second media opening 120b, thus on its underside, which acts together with a sealing seat 136b delimiting the second media opening 120b, which is executed as a sealing element 136b that engages the second media opening 120b from behind.

The first and second connecting element 122a, 122b have in each case guiding elements in form of a recess 138a, 138b to guide the first or second SMA element 124a, 124b. The recess 138a starting, for example, from a circular circumferential surface of the first valve element 122a extending perpendicularly towards the direction of movement B1 and along the plane E1, into the valve element 122a, and the first SMA element 124a is inserted in the recess 138a or guided through it. The SMA element 124a is thus guided in a middle section of the valve element 122a. This design has the advantage that the sealing element 134a to seal up the first media opening 120b on the upper side of the valve element 122a can be arranged without a problem without having to pay attention to the SMA element 124a. The recess 138b, which serves to guide the second SMA element 124b, is arranged on an upper side of the valve element 122b and extends, for example, between two end sections of the valve element 122b mounted for guiding into the recess 146b or through the valve element 122b itself.

Figure 8:
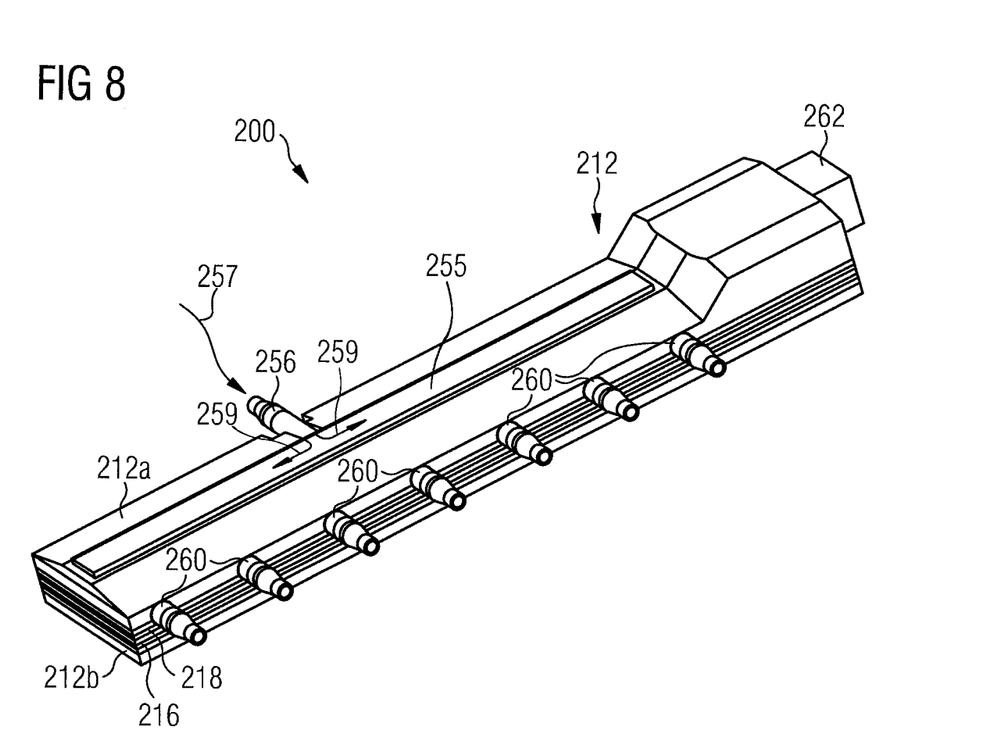
FIG. 8 is an isometric view of a valve arrangement with several valves.

FIG. 8 shows a valve arrangement 200 that includes several valves 10 according to the embodiment shown in FIGS. 1 to 3 or several valves 110 according to the embodiment shown in FIGS. 4 to 7. Here, the valve arrangement 200 has seven valves 10, 110, so that seven media reservoirs, especially a vehicle seat comfort system with seven air cushions, can be controlled independently from one another. The housing 212 that encloses the pressure chamber 14, 114 of each valve 10, 110 or the first housing parts 212a and second housing parts 212b as well as the printed circuit boards 216 and sealing plates 218 are in each case executed as one piece, thereby lowering the manufacturing costs, simplifying the assembly of the valve arrangement 200 and reducing the need for space of the valve arrangement in a vehicle seat, for example. In order to obtain nonetheless separate pressure chambers 14, 114 that allow an independent control of the individual valves 10, 110 or media reservoir, the pressure chamber delimited by the housing part 212a is subdivided, for example, into several pressure chambers 14, 114 by separating walls protruding from the inner circumferential surface. In the assembled state, the first housing part 212a and the second housing part 212b are attached to one another with screws, for example (not shown), so that the printed circuit board 216 and the sealing plate 218 are pressed against one another to close the pressure chambers 14, 114 in a pressure-tight way. The first media openings 20a, 120a are connected to one another via a distribution channel 255, so that only one connection 256 is necessary for introducing a fluid into the distribution channel 255, such as a pump connection that serves to introduce air, for example. (See fluid flow path 257 into connection 256 and fluid flow paths 259 into distribution channel 255). Activating the corresponding valve element 22a, 122a opens the first media opening 20a, 120a associated with the corresponding valve 10, 110 and the respective pressure chamber 14, 114 is filled. The corresponding media reservoir is connected via connections 260 through the respective associated third media opening 20c, 120c, so that it can be filled and emptied. The second media openings 20b, 120b lead out of the pressure chamber 14, 114 (not shown) on the underside of the valves 10, 110. Connections 262 leading out of the housing 212 of the valve arrangement 200 ensure the voltage supply of the printed circuit board 216 and thus the energization of the SMA elements 124a, 124b necessary for activating the valve elements 22, 122a, 122b.

LIST OF REFERENCE CHARACTERS 10, 110 Valve
12, 112, 212 Housing
12a, 112a, 212a First housing part
12b, 112b, 212b Second housing part
14, 114 Pressure chamber
16, 116, 216 Printed circuit board
18, 118, 218 Sealing plate
20a, 120a First media opening
20b, 120b Second media opening
20c, 120c Third media opening
22, 122a, 122b Valve element
24, 124a, 124b Wire-shaped SMA element
26, 126a, 126b First end of an SMA element
28, 128a, 128b Second end of an SMA element
30, 130a, 130b Middle section of an SMA element
32, 132a, 132b Spring element
33, 133a, 133b First end section of a spring element
34a, 34b, 134a, 134b Sealing element
35, 135a, 135b Second end section of a spring element
36a, 36b, 136a, 136b Sealing seat
37, 137a, 137b Leaf spring
38, 138a, 138b Recess
139 Threaded compression spring
40, 140a, 140b Opening direction
42, 142a, 142b Closing direction
44, 144 Crimp connector
146a, 146b Recess
200 Valve arrangement
256 Pump connection
260 Connections for media reservoir
262 Connections for printed circuit board
I, IA, IB First position of the valve element 22, 122a, 122b
II, IIA, IIB Second position of the valve element 22, 122a, 122b
B, B1, B2 Direction of movement of the valve elements 22, 122a, 122b
E, E1, E2 Plane of the SMA elements 24, 124a, 124b

We claim:

1. A valve comprising:
   a housing enclosing a pressure chamber;
   at least one first media opening defined in a first housing part of the housing; and
   at least one first valve element arranged in the pressure chamber and activated by a first wire-shaped SMA element, the first valve element being movable along a first direction of movement between a first position, in which the first valve element closes the first media opening, and a second position, in which the first valve element releases the first media opening, the first wire-shaped SMA element being connected to a printed circuit board via a first end and a second end, the first wire-shaped SMA element being connected in a middle section to the first valve element in such a way that the first wire-shaped SMA element extends in a first plane oriented parallel to the first direction of movement, the first valve element being guided into a recess in at least one of the first housing part, the printed circuit board, and a sealing plate;
   wherein: a) the housing defines a second media opening controlled by the first valve element, and wherein the first valve element opens the second media opening in the first position and closes the second media opening in the second position; or
   b) the housing defines a second media opening movable by a second valve element arranged in the pressure chamber and activated by a second wire-shaped SMA element, the second valve element being movable a second direction of movement between a first position, in which the second valve element closes the second media opening, and a second position, in which the second valve element releases the second media opening, the second wire-shaped SMA element being electrically connected to the printed circuit board via a first end and a second end, the second wire-shaped SMA element being connected in a middle section to the second valve element in such a way that the second wire-shaped SMA element extends in a second plane oriented parallel to the second direction of movement, the second valve element being guided in at least one of the second housing part, the printed circuit board, and a sealing plate.

2. The valve according to claim 1, wherein the first wire-shaped SMA element moves the first valve element in an opening direction with regard to the first media opening.

3. The valve according to claim 1, wherein at least one of the first valve element and the second valve element is mounted in a way to execute a translational movement between the respective first position and the respective second position, and wherein at least one of the first direction of movement of the first valve elements and the second direction of movement of the second valve element runs perpendicularly to the printed circuit board.

4. The valve according to claim 1, wherein the second media opening is defined in at least one of the printed circuit board and in a second housing part of the housing.

5. The valve according to claim 1, wherein at least one spring element moves the first valve element in a closing direction with regard to the first media opening, and wherein at least one spring element moves the second valve element in an opening direction with regard to the second media opening.

6. The valve according to claim 5, wherein the at least one spring element pre-stresses the first valve element in its first position, and wherein the at least one spring element pre-stresses the second valve element in its second position.

7. The valve according to claim 1, wherein a sealing element is arranged on a side of one of the first valve element and the second valve element facing the first media opening, which acts together with a sealing seat delimiting the first media opening, and wherein a sealing element is arranged on a side of one of the first valve element and the second valve element facing the second media opening, which acts together with a sealing seat delimiting the second media opening.

8. The valve according to claim 7, wherein the sealing seats delimiting the first media opening and the second media opening fully engage around the respective first media opening and the second media opening.

9. The valve according to claim 1, wherein at least one of the first valve element and the second valve element has guiding elements to guide at least one of the first wire-shaped SMA element and the second wire-shaped SMA element, wherein the guiding elements include a recess extending along the at least one of first plane and the second plane, in which at least one of the first wire-shaped SMA element and the second wire-shaped SMA element is inserted.

10. The valve according to claim 1, wherein the housing defines a third media opening.

11. The valve according to claim 10, wherein the first media opening is a pressure connection, the second media opening is an atmosphere connection, and the third media opening is a connection for a media reservoir.

12. The valve according to claim 1, wherein the second wire-shaped SMA element moves the second valve element in a closing direction with regard to the second media opening.

13. The valve according to claim 11, wherein the media reservoir is an air cushion integrated into a vehicle seat.

14. A valve arrangement that includes several valves according to claim 1, wherein a common housing encloses multiple of the valves.

* * * * *